(12) United States Patent
Slezak et al.

(10) Patent No.: US 8,237,454 B2
(45) Date of Patent: Aug. 7, 2012

(54) MEASURING DEVICE AND METHOD FOR LOCAL MEASUREMENT OF AT LEAST ONE ELECTRICAL PROPERTY OF THE CONTENT OF A CONTAINER

(75) Inventors: Marian Jozef Slezak, Rijsbergen (NL); Cornelis Wijnand Schoenmakers, Dordrecht (NL)

(73) Assignee: Fluid Well Instruments B.V. (NL)

( * ) Notice: Subject to any disclaimer, the term of this patent is extended or adjusted under 35 U.S.C. 154(b) by 820 days.

(21) Appl. No.: 12/328,940

(22) Filed: Dec. 5, 2008

(65) Prior Publication Data

US 2009/0153150 A1 Jun. 18, 2009

(30) Foreign Application Priority Data

Dec. 5, 2007 (NL) .................................. 2001057

(51) Int. Cl.
*G01R 27/26* (2006.01)
*G01R 27/08* (2006.01)
*G01F 23/24* (2006.01)
*G01F 23/26* (2006.01)

(52) U.S. Cl. ........ 324/663; 324/667; 324/670; 324/674; 324/681; 324/685; 324/693; 324/697; 324/698; 324/707; 324/721; 73/304 R; 73/304 C

(58) Field of Classification Search .................. 324/658, 324/663, 664, 667, 669, 670, 674, 681, 684–686, 324/689–691, 693, 694, 696–698, 707, 720, 324/721; 73/304 R, 304 C
See application file for complete search history.

(56) References Cited

U.S. PATENT DOCUMENTS

| | | | | | |
|---|---|---|---|---|---|
| 4,679,433 | A | * | 7/1987 | Clinton et al. ............... | 73/304 C |
| 4,935,727 | A | * | 6/1990 | Re Fiorentin et al. ....... | 73/304 R |
| 6,073,488 | A | * | 6/2000 | Byatt et al. .................. | 73/304 C |
| 6,101,873 | A | | 8/2000 | Kawakatsu et al. | |
| 6,318,172 | B1 | * | 11/2001 | Byatt et al. .................. | 73/304 C |
| 6,420,882 | B1 | * | 7/2002 | Engebretsen et al. ......... | 324/667 |
| 6,564,630 | B1 | * | 5/2003 | Klemp ......................... | 73/304 C |
| 6,761,067 | B1 | * | 7/2004 | Capano ........................ | 73/304 C |
| 6,782,736 | B1 | * | 8/2004 | Hammer ...................... | 73/304 C |
| 7,107,838 | B2 | * | 9/2006 | Chai et al. ................... | 73/304 C |
| 7,161,361 | B2 | * | 1/2007 | Qu et al. ...................... | 73/304 C |
| 7,275,430 | B2 | * | 10/2007 | Zuleta et al. ................ | 73/304 R |
| 7,487,677 | B2 | * | 2/2009 | Chai et al. ................... | 73/304 C |
| 2006/0021432 | A1 | | 2/2006 | Salzmann et al. | |

OTHER PUBLICATIONS

Herman Boerrigter, "NL Application No. 2001057 Search Report and Written Opinion", Apr. 25, 2008, Publisher: PCT, Published in: NL.

* cited by examiner

*Primary Examiner* — Timothy J Dole
(74) *Attorney, Agent, or Firm* — Kaplan Breyer Schwarz & Ottesen LLP

(57) ABSTRACT

Measuring device for local measurement of an electrical property of the content of a container, wherein at least three electrodes are disposed adjacently of each other in height direction and electrically insulated from each other, wherein each of the electrodes can be connected to an electrical measuring circuit for measuring, via one of the electrodes and one other electrode connected to an electrical earth, the electrical property of the content of the container in the vicinity of the electrodes, and wherein the electrical measuring circuit is adapted to generate at least one electric measuring signal representing the measured electrical property, and a control unit for connecting the one electrode to the electrical measuring circuit and connecting the other electrode to an electrical earth.

17 Claims, 4 Drawing Sheets

MEASURING DEVICE AND METHOD FOR LOCAL MEASUREMENT OF AT LEAST ONE ELECTRICAL PROPERTY OF THE CONTENT OF A CONTAINER

FIELD OF THE INVENTION

The present invention relates to a measuring device and method for local measurement of at least one electrical property of the content of a container, in particular a container for a number of substances to be separated from each other by means of settling, such as a mixture of water and oil contaminated with sand.

BACKGROUND OF THE INVENTION

Such a mixture is pumped into the container, after which the substances present separate in vertical direction in accordance with their difference in specific weight. After a period of time layers distinguishable in vertical direction are situated in the container, wherein it is desirable to be able to determine which substance each layer comprises and what the relevant height of each layer is. A known method for doing this is to measure an electrical property of the content of the container at different heights, using a measuring device for local measurement of at least one electrical property of the content of the container. The measuring device here comprises at least three electrodes disposed adjacently of each other in height direction and electrically insulated from each other, wherein each of the electrodes can be connected to an electrical measuring circuit for measuring, via one of the at least three electrodes and at least one other of the at least three electrodes which is connected to an electrical earth, the electrical property of the content of the container in the vicinity of the electrode connected to the measuring device and the at least one electrode connected to the electrical earth. The electrical measuring circuit is here adapted to generate at least one electric measuring signal representing the measured electrical property, and the device comprises a control unit for connecting at least one of the at least three electrodes to the electrical measuring circuit and connecting at least one other of the at least three electrodes to an electrical earth.

Such devices are known from, among others, the European patent application EP-A-1 744 132 which describes a capacitive level sensor, wherein an electric probe with a number of electrodes is present which, using a measuring circuit, can measure an electrical capacitance relative to a common electrical earth.

The American patent U.S. Pat. No. 6,164,132 describes a capacitive liquid level indicator wherein a number of adjacent electrodes are arranged on a substrate, and wherein each electrode is coupled to an electric signal detection circuit.

The known devices have the drawback however that they do not accurately measure the electrical property, in particular the capacitance, of the content of the container to be measured, since the measurement is subject to influences from outside the immediate vicinity of the electrodes.

SUMMARY OF THE INVENTION

The present invention has for its object to provide a method and device for local measurement of at least one electrical property of the content of the container which is less sensitive to conditions outside the immediate vicinity of the electrodes.

The invention provides such a device for this purpose, wherein the control unit is adapted to connect to the electrical earth at least one other electrode adjacent to the first electrode, and to insulate the remaining electrodes from the electrical measuring circuit and the electrical earth.

By measuring the content of the container between two adjacent electrodes the field influencing the measurements is kept as small as possible, whereby outside influences such as those of scattering are minimized. The various measurements are hereby more readily comparable to each other, because the area within which the measurement is performed is substantially the same during each measurement between two adjacent electrodes, while in cases where use is made of a shared earth electrode this is not guaranteed.

The control unit is preferably adapted to connect to the electrical earth the electrodes adjacent on the top side and the bottom side to the electrode connected to the electrical measuring circuit. The above-mentioned adverse effects are hereby further minimized.

In an advantageous embodiment the control unit is adapted to connect at least some of the electrodes sequentially to the electrical measuring circuit. In this way an overall picture can be rapidly obtained of the completion of the separation process inside the container. The successive measurement has the advantage that relative measurements do not affect each other, or hardly so. In the case of a very large number of electrodes, it is also possible to opt to have measurements take place simultaneously at a sufficient distance from each other, for instance more than 10 times the distance between two electrodes, and preferably more than 20 times the distance between two electrodes, which does however make higher demands of the measuring device.

The electrical measuring circuit is preferably adapted to successively measure an electrical capacitance and an electrical resistance of the content in the vicinity of each of the electrodes. The electrical conductivity can of course also be measured instead of the electrical resistance. By measuring a plurality of electrical properties an even more accurate differentiation can be made between the content of the container at different heights, since substances which would have the same capacitance at a determined temperature can hereby be differentiated on the basis of their electrical resistance, and vice versa. Particularly in the cases where at least one of the two has a very large or very small value, whereby a measurement provides little information, it is advantageous to perform a second measurement in order to nevertheless enable a differentiation to be made.

It has been found that measuring the electrical resistance in the case of water and sand layers produces a well differentiated result, as does measuring the capacitance in the case of oil, gas and foam layers, and that in the case of an emulsion layer both measurements are highly relevant in determining the difference.

In a further embodiment the measuring circuit is adapted to measure the temperature of the content of the container in the vicinity of the electrode and to generate an electrical measurement signal representing the measured temperature. On the basis of the measured temperature not only can relative measured values of electrical properties such as resistance and capacitance, which are temperature-dependent, be better compared, the nature of the content of the container can also be determined when the temperature is known during performing of the measurement on the basis of the magnitude of the measured electrical quantity, by comparing this measured quantity to theoretically known values at a determined temperature of possibly present substances. A distinction can hereby be made between substances with a range of the quantities to be measured which could overlap under the influence of the temperature.

In yet another embodiment the measuring circuit comprises a number of sub-measuring circuits, each connected to one of the electrodes by means of a controllable connection, wherein each of the sub-measuring circuits is positioned in the vicinity of the electrode to which they can be connected. The electrical wiring required between the electrode and the sub-measuring circuit can hereby be kept short, whereby parasitic capacitance within the measuring circuit is minimized.

Each of the sub-measuring circuits is particularly adapted here to generate at least one electrical measurement signal, the frequency of which represents the measured value, and wherein the output connection of each of the sub-measuring circuits is connected to a signal line which is shared by each of the sub-measuring circuits and leads to a main measuring circuit. Such a form of signal is particularly insensitive to transmission characteristics of signal lines, and it is also possible in this way to provide the measuring device with a single signal line for the purpose of sending the electrical measurement signals to a central processing unit when the diverse electrical measuring circuits are adapted to generate electric signals with non-overlapping frequency ranges, since such signals can subsequently be easily separated from each when they are superposed on an electrical signal wire. A relatively simple construction of the device hereby becomes possible.

The electrical measuring circuit is preferably adapted to successively measure the electrical capacitance and electrical resistance prevailing between an electrode and respectively above and below this electrode, and the temperature prevailing in the vicinity of this electrode. Keeping to this measurement sequence ensures that the measurement values reflect a substantially unchanged consistency of the content of the container, whereby they can be compared to each other and used for the purpose of differentiating mutually differing substances present in the container.

Each of the sub-measuring circuits is more preferably connected to a sub-control circuit which is placed in its vicinity and which is adapted to control the sub-measuring circuit connected thereto, and the input connection of each of the sub-control circuits is connected to a control line which is shared by each of the sub-control circuits and comes from a main control circuit, whereby only four wires need be drawn through a housing of the measuring device, such as a pipe, i.e. two power supply wires, a measuring wire and a control wire.

In a particularly efficient embodiment the control circuit is adapted to successively measure capacitance and resistance in the vicinity of an electrode and to subsequently measure the same values in the vicinity of the electrode adjacent thereto.

In order to provide a stand-alone measuring device readily applied in containers of differing form, the electrodes are preferably accommodated in a rod-like structure extending in vertical direction.

When a measuring device extending as a separate structure inside the container is less desirable, it is attractive for the electrodes to be arranged in a structure extending along a vertical wall of the container.

Particularly in the case of containers filled with aggressive substances it is attractive that the electrodes of the measuring device do not come into contact with the aggressive substance. It is then recommended that the electrodes are arranged on the outside of the container and that the container is manufactured from an electrically insulating material.

In a subsequent embodiment adjacent electrodes are placed at a mutual centre-to-centre distance of between 10 mm and 30 mm, and in particular 20 mm. A high resolution is hereby achieved in the differentiation of diverse layers.

Further advantage can be gained when adjacent electrodes are separated by an insulation of between 1 mm and 10 mm, and in particular 5 mm. The measuring device can herein comprise between 10 and 200, and in particular 80 electrodes, whereby the device is adapted for use with a normal size container.

The measuring device according to the present invention is particularly placed in a separating vessel for separating pumped-up oil from the substances pumped up with the oil. Such vessels are generally adapted, after the measurement has been performed, to draw off or otherwise drain or discharge at least a layer of the content of the vessel on the basis of the measurement information.

BRIEF DESCRIPTION OF THE DRAWINGS

The invention will now be further elucidated on the basis of the following figures, in which.

DETAILED DESCRIPTION OF THE INVENTION

Figure 1:
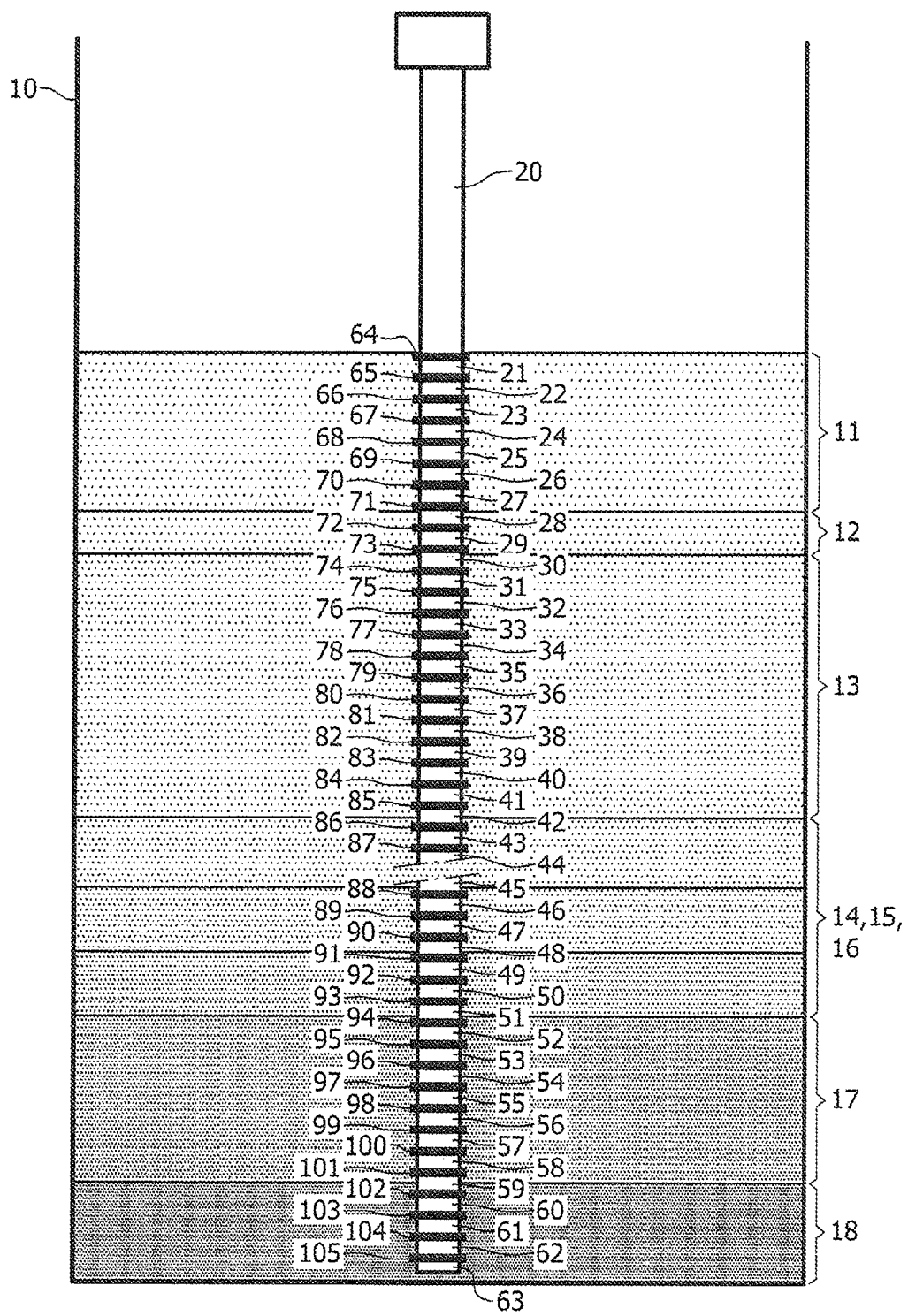
FIG. 1 shows a container provided with a measuring device according to the present invention.

FIG. 1 shows a container 10 for a number of substances 11-18 to be separated from each other by means of settling. Present in the container is a gas layer 11, a foam layer 12, an oil layer 13, emulsion layers 14, 15 and 16, a water layer 17 and a mud layer 18.

Also placed in the container is measuring device 20 which comprises electrodes 21-63 which are separated by insulations 64-103. The measuring device has a rod-like configuration which extends vertically inside container 10, wherein measuring electrodes 21-63 of the measuring device extend at least over that height which is filled during use of container 10. In the present case at least one measuring electrode 21-63 is therefore situated at the level of each of the layers of substance 11-18.

The measuring device is adapted to connect a first electrode, for instance electrode 22, to an electrical measuring circuit, and to connect to the electrical earth at least one other electrode 21 adjacent to first electrode 22, and to insulate the remaining electrodes 23-63 from the electrical measuring circuit and the electrical earth, or—in order to obtain a more accurate measurement—to connect the first electrode, for instance electrode 22, to an electrical measuring circuit and to connect electrodes 21 and 23 to the electrical earth and to insulate the remaining electrodes 24-63 from the electrical measuring circuit and the electrical earth. For the purpose of measuring at least one property of the content of container 10 one of the electrodes 21-63 at a time is in this way connected to an electrical measuring circuit, while at least one, and preferably the two adjacent electrodes, are connected to the electrical earth. The device can be controlled here such that adjacent electrodes lie in a direction from the top to the bottom, or vice versa, or a random sequence is followed.

In addition to the configuration shown in FIG. 1, wherein the measuring device is located directly in the vessel, the measuring device can also be placed in a so-called bypass of the container vessel. Such a bypass comprises a vessel communicating with the first container and having a limited volume. The measuring device is preferably dimensioned such that it can be readily placed in such a bypass, and has for this purpose a cross-section which is slightly smaller than an opening of the bypass, which as a rule is about 2 inches (5 cm).

Figure 2:
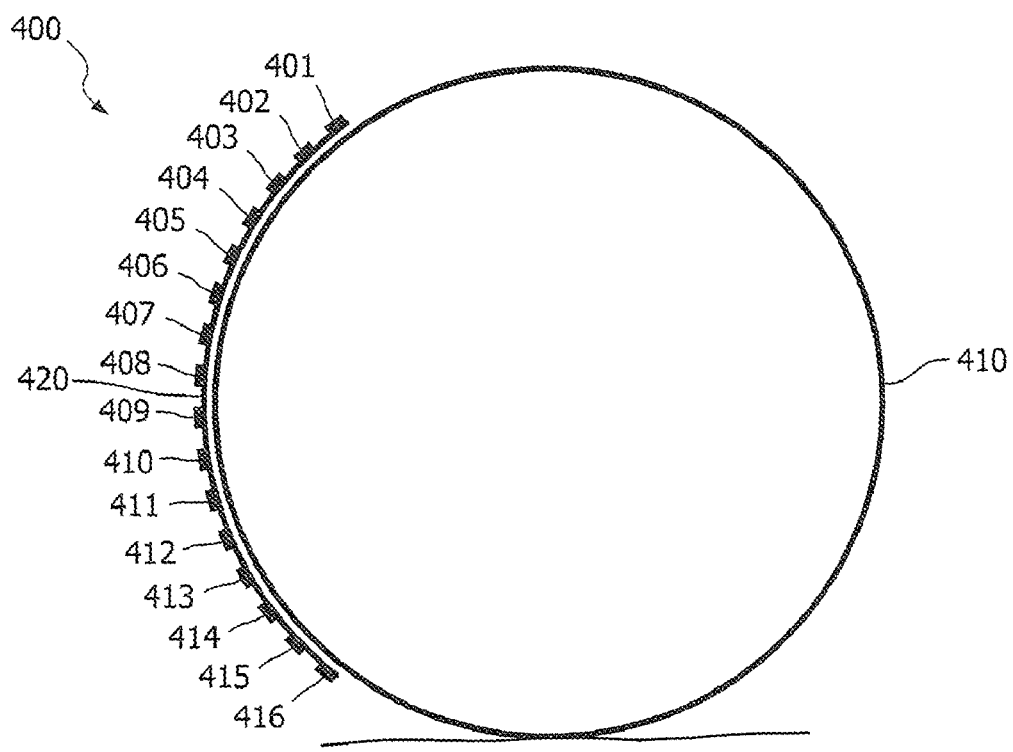
FIG. 2 shows an alternative embodiment in which the measuring device is placed on the outside of the container.

FIG. 2 shows an alternative embodiment 400 in which the measuring device is placed on the outside of container 430. The measuring device comprises a number of electrodes 401-416 which are mounted on a carrier 420. This carrier is preferably a flexible carrier so that the measuring device can be placed on containers of varying diameter. It is only possible to carry out capacitive measurements with this configuration, since the surface of the container would disturb resistance and conductivity measurements. This embodiment can be applied particularly when the container is manufactured from glass or plastic. The advantage of a measuring device placed on the outside of the container is that the measuring device is not exposed to the content of the vessel which—particularly when chemicals, for instance for preventing foaming, are applied in the container—could adversely affect the measuring device. For safety reasons, for instance because of the high pressure prevailing in such a vessel, which can amount to 25-50 bar, it may also be undesirable to arrange a measuring device and the passage openings required therefore in the vessel. It is noted that account must be taken here of the curvature of the cylindrical vessel 430 which is placed with its axis horizontally.

The measuring device can in all embodiments be cast in a moulding resin, such as polyurethane, for protection against outside influences.

Owing to the above-mentioned advantageous embodiments it is possible to use the device according to the present invention within a temperature range of −40 degrees Celsius to +125 degrees Celsius.

Figure 3:
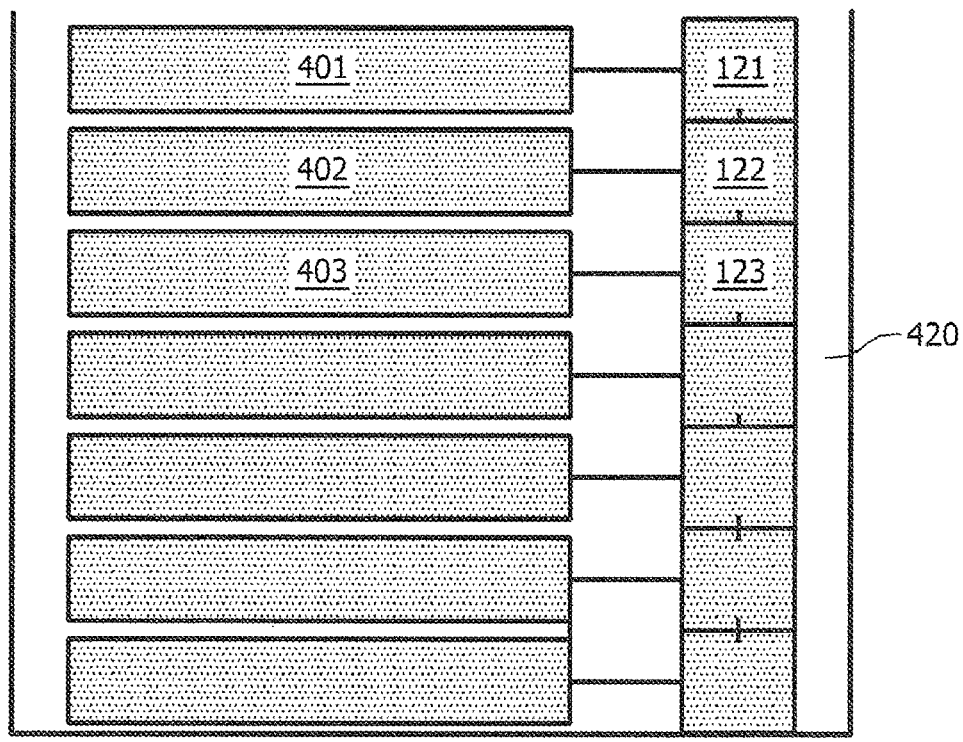
FIG. 3 shows carrier 420.

FIG. 3 shows such a carrier 420, which is manufactured from electrically insulating material and on which electrodes 401-416 are placed, as are sub-measuring devices designated as a whole with 121-123.

Figure 4:
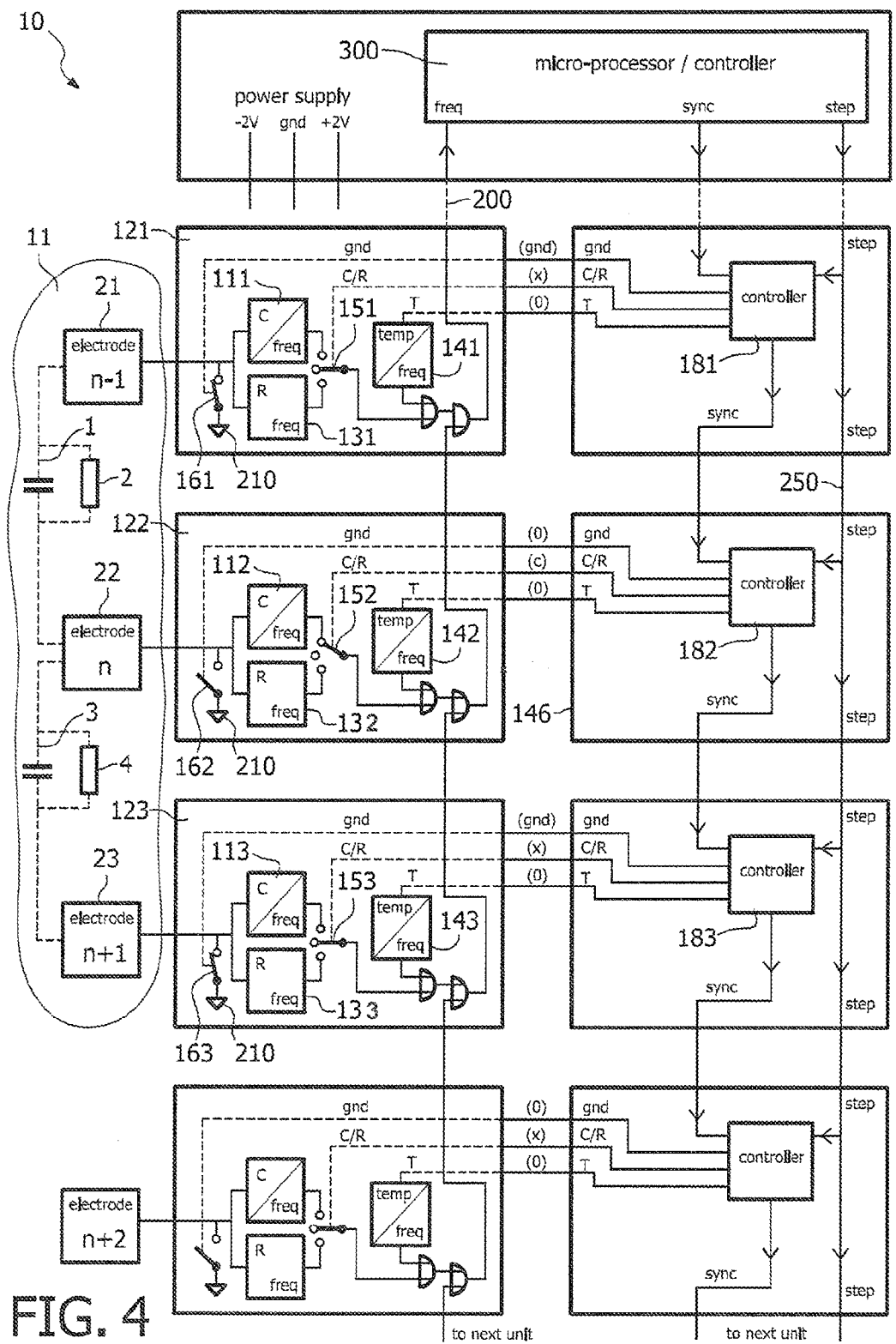
FIG. 4 shows an electrical circuit diagram of a part of the measuring device.

FIG. 4 shows an electrical circuit diagram of a part of the device of FIG. 1a or 1b. FIG. 2 shows electrodes 21, 22, 23 which are respectively connected to sub-measuring devices 121, 122, 123.

Each of the sub-measuring devices 121, 122, 123 comprises respectively a capacitance measuring device 111, 112, 113, a resistance measuring device 131, 132, 133 and a temperature measuring device 141, 142, 143.

Sub-measuring devices 121, 122, 123 further comprise a respective first switch 151, 152, 153 for connecting the respective electrode 21, 22, 23 to the single signal wire 200 via capacitance measuring device 111, 112, 113 or via resistance measuring device 131, 132, 133, and a respective second switch 161, 162, 163 for connecting electrode 21, 22, 23 to an electrical earth 210. The single signal wire 200 is connected to central processing unit 300.

In the situation shown in FIG. 4 electrode 22 is connected by means of switch 152, which is preferably formed by an electronic switch, to the single signal wire 200 via capacitance measuring device 112, which wire sends measurement data to central processing unit 300. The measurement data are provided here by the capacitance measuring device 112 in the form of an electric signal, the frequency of which is representative of the magnitude of the measured capacitance.

Through operation of switch 152 the electrode 22 can however be connected via resistance measuring device 133 to the single signal wire 200 in order to transmit a measured resistance value to the central processing unit 300. It is noted here that both the resistance measuring device 133 and capacitance measuring device 113 are always both connected to the active measuring electrode. Switch 162 for connecting electrode 22 to an electrical earth 210 is here open.

Because electrodes 21 and 23 are connected to electrical earth 210 by means of the respective switches 161 and 163, the device is set to measure an electrical property of the content 11 of container 10 of FIG. 1, measured between electrode 22 and the adjacent electrodes 21 and 23. The electrical property is here the parallel capacitance 1,3 between the respective pairs of electrodes 22, 21 and 22, 23. When switch 152 is connected to resistance measuring device 132, the electrical property is the parallel electrical resistance 2,4 between the pairs of electrodes 22, 21 and 22, 23. Temperature measuring devices 144, 133, 143 are also set to measure the respective temperatures of content 11 of container 10 in the vicinity of electrodes 21, 22, 23. The measuring devices also generate an output signal to the common signal line, wherein the frequency of the signal is a measure of the measured value, in this case the temperature.

For the purpose of operating the switches, and thereby the measuring function, use is made of control circuits 181, 182 and 183 which are arranged, just as measuring devices 121, 122 and 123, for each electrode and which are connected by means of a central control line 250 to central control circuit 300.

Printed circuit boards for use inside this measuring device advantageously comprise electronics for measuring about 20 electrodes. The overall length of the measuring device can be chosen subject to the level of the liquid to be measured in the container, and can for instance amount to about 4 metres.

Figure 5:
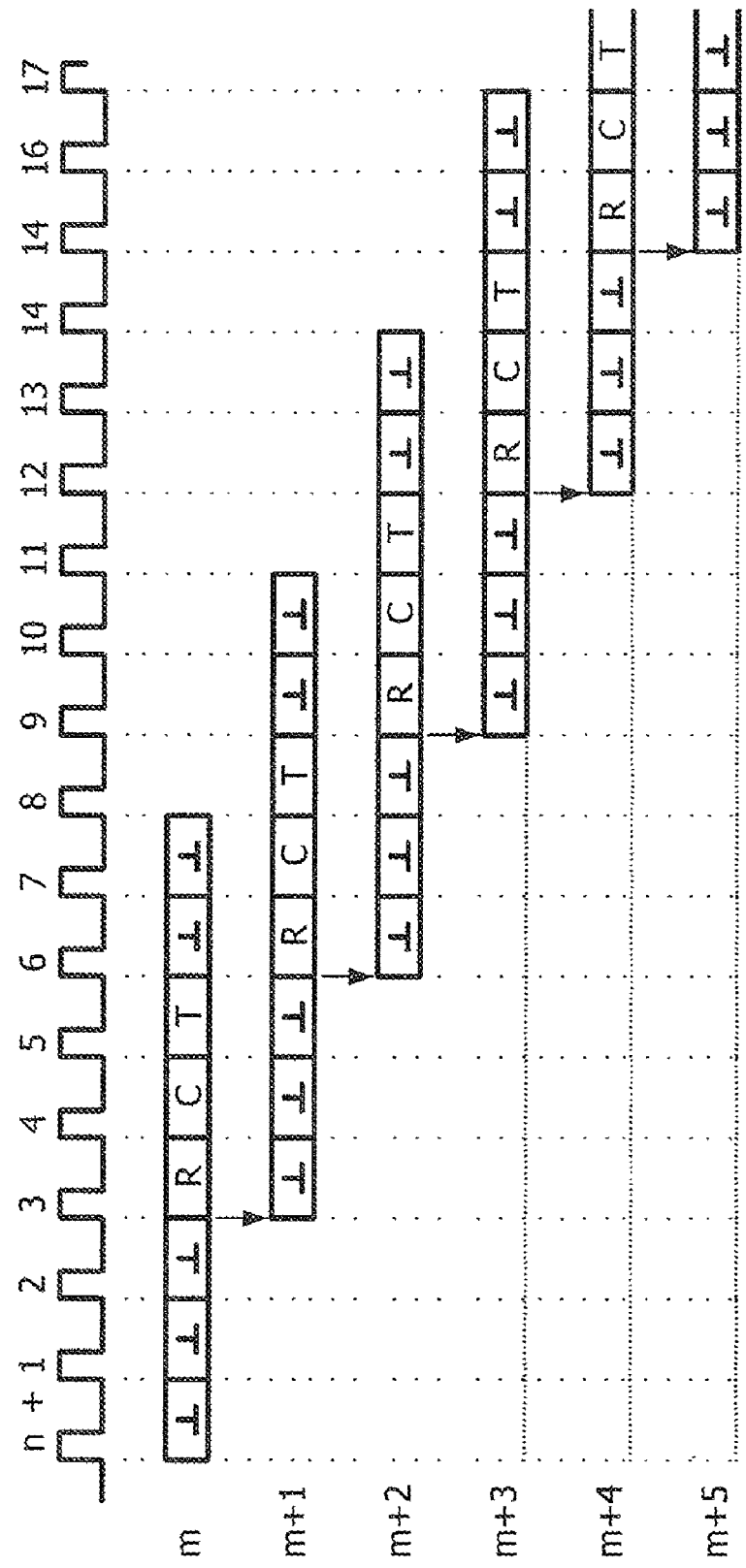
FIG. 5 shows a time schedule for method steps according to the present invention.

FIG. 5 shows a time schedule for method steps according to the present invention. Time intervals n, n+1, n+2, ( . . . ) n+17 are shown in the time schedule. These time intervals are for instance generated by a digital clock in central processing unit 300 of FIG. 2 and last several milliseconds. It has been found desirable and feasible here to complete overall measurement of all layers inside the container in about a half or whole second.

In the example shown in the figure the time intervals for measuring the diverse electrical quantities are shown to be the same. The intervals for measuring a resistance can however advantageously be shorter than those for measuring a capacitance. This is because during a capacitance measurement charging and discharging effects can occur which must fade for at least the greater part in order to be able to determine a sufficient measured value. The higher the value of the dielectric constant of the content of the container, the greater is the difference between the measuring time required for the resistance and the capacitance.

In an advantageous embodiment of the present invention the actual measurement time is determined by a microprocessor of the central processing unit.

During the $n^{th}$ and $n+1^{st}$ time interval the $m^{th}$ electrode is connected to an electrical earth ⊥. During the $n+2^{nd}$ time interval the $m^{th}$ electrode is connected to the electrical earth ⊥, or it is insulated from the electrical measuring circuit and the electrical earth. During the $n+3^{rd}$ and $n+4^{th}$ time interval the $m^{th}$ electrode is coupled to the electrical measuring circuit for measuring an electrical capacitance C in one of these measuring intervals and for measuring an electrical resistance R between the $m^{th}$ electrode and the $m+1^{st}$ and the $m-1^{st}$ electrode in the other measuring interval. The temperature T of the $m^{th}$ electrode is measured during the $n+5^{th}$ time interval.

During the $n+6^{th}$ and $n+7^{th}$ time interval the $m^{th}$ electrode is connected to an electrical earth and during an $n+8^{th}$ and further time intervals the $m^{th}$ electrode is insulated from the electrical measuring circuit and the electrical earth. The above stated steps are then performed for an m+1$^{th}$ electrode adjacent to the m$^{th}$ electrode at a k=n+3$^{rd}$ interval, this sequence being repeated in the same way for each subsequent electrode. In this way electrodes form in each case a precise measurement reference connected to the electrical earth when adjacent electrodes are switched on for measuring an electrical capacitance C or an electrical resistance R. The sequence of measurement of the capacitance C and the resistance R can however be reversed here, and during measurement of the temperature T of content 11 of container 10 of FIG. 1 all other electrodes can either be connected to the electrical earth ⊥ or insulated from the electrical measuring circuit and the electrical earth.

Although the foregoing elucidation refers to three electrodes, it will be apparent that in practice a larger number of electrodes is used.

The shown method steps can be varied in numerous ways, wherein the control unit is adapted in each case to connect to the electrical earth at least one other electrode adjacent to the first electrode and to insulate the other electrodes from the electrical measuring circuit and the electrical earth.

In addition to use in the field of separating water and oil, the present invention is particularly suitable for use in petrochemical processes such as the manufacture of styrene, wherein polyols and potassium hydroxide must be separated from each other, or for the separation of catalysts from overlying hydrocarbon layers. The progress of such processes can also be monitored using the device and method according to the present invention.

The invention claimed is:

1. A measuring device for local measurement of an electrical resistance and a capacitance of a content of a container, comprising:
at least three electrodes disposed adjacently of each other in a direction with a vertical component and electrically insulated from each other, wherein each of the electrodes is adapted to be connected to an electrical measuring circuit for measuring, via one of the at least three electrodes and at least one other of the at least three electrodes which is connected to an electrical earth, the electrical resistance and the capacitance of the content of the container in the vicinity of the electrode connected to the measuring device and the electrical earth, wherein
the electrical measuring circuit is adapted for measuring the electrical resistance and for measuring the capacitance;
the electrical measuring circuit is adapted to generate at least one electric measuring signal representing the measured electrical resistance or the capacitance;
a control unit for connecting at least one of the at least three electrodes to the electrical measuring circuit, wherein
the control unit is adapted to insulate other remaining electrodes from the electrical measuring circuit and the electrical earth, and
the electrical measuring circuit comprises a number of sub-measuring circuits, each connected to one of the electrodes by means of a controllable connection, and that the sub-measuring circuits are each positioned in the vicinity of the electrode to which they are connectable.

2. The measuring device as claimed in claim 1, wherein the control unit is adapted to connect to the electrical earth the electrodes adjacent on the bottom side and the top side to the electrode connected to the electrical measuring circuit.

3. The measuring device as claimed in claim 1, wherein the control unit is adapted to connect at least some of the number of electrodes sequentially to the electrical measuring circuit.

4. The measuring device as claimed in claim 3, wherein the control circuit is adapted to successively measure capacitance and resistance in the vicinity of an electrode and to subsequently measure the same values in the vicinity of the electrode adjacent thereto.

5. The measuring device as claimed in claim 1, wherein the measuring circuit is adapted to measure the temperature of the content of the container in the vicinity of at least one of the three electrodes and to generate an electrical measurement signal representing the measured temperature.

6. The measuring device as claimed in claim 1, wherein each of the electrical sub-measuring circuits is adapted to generate at least one electrical measurement signal, the frequency of which represents the value measured by the sub-measuring circuit, and that the output connection of each of the sub-measuring circuits is connected to a signal line which is shared by each of the sub-measuring circuits and leads to a main measuring circuit.

7. The measuring device as claimed in claim 1, wherein the electrical measuring circuit is adapted to subsequently measure the electrical capacitance and electrical resistance prevailing between an electrode and respectively above and below this electrode, and the temperature prevailing in the vicinity of this electrode.

8. The measuring device as claimed in claim 1, wherein each of the sub-measuring circuits is connected to a sub-control circuit which is placed in its vicinity and which is adapted to control the sub-measuring circuit connected thereto, and that the input connection of each of the sub-control circuits is connected to a control line which is shared by each of the sub-control circuits and comes from a main control circuit.

9. The measuring device as claimed in claim 1, wherein the electrodes are accommodated in a rod-like structure extending in vertical direction.

10. The measuring device as claimed in claim 1, wherein the electrodes are arranged in a structure extending along a vertical wall of the container.

11. The measuring device as claimed in claim 10, wherein the electrodes are arranged on the outside of the container and that the container is manufactured from an electrically insulating material.

12. The measuring device as claimed in claim 1, wherein adjacent electrodes are placed at a mutual centre-to-centre distance of between 10 mm and 30 mm.

13. The measuring device as claimed in claim 1, wherein adjacent electrodes are separated by an insulation of between 1 mm and 10 mm.

14. The measuring device as claimed in claim 1, wherein it comprises between 10 and 200 electrodes.

15. The measuring device as claimed in claim 1, wherein the device is placed in a separating vessel for separating pumped-up oil from the substances pumped up with the oil.

16. A method for local measurement of an electrical resistance and a capacitance of a content of a container, comprising:
providing at least three electrodes disposed adjacently of each other in height direction and electrically insulated from each other;
connecting each of the electrodes successively to an electrical measuring circuit, wherein the electrical measuring circuit is adapted for measuring the electrical resistance and for measuring the capacitance;
determining, via the electrode connected momentarily to the measuring circuit and at least one other of the at least three electrodes which is connected to an electrical earth, the electrical resistance and the capacitance of the content of the container in the vicinity of the electrode connected to the measuring device and the at least one electrode connected to the electrical earth; and generating an electric measuring signal representing the measured electrical property resistance or the capacitance;

wherein connecting to the electrical earth at least one other electrode adjacent to the first electrode, and insulating the remaining electrodes from the electrical measuring circuit and the electrical earth, and connecting a number of sub-measuring circuits such that each sub-measuring circuit is connected to one of the electrodes by means of a controllable connection, wherein the sub-measuring circuits are each positioned in the vicinity of the electrode to which they are connectable.

17. The method as claimed in claim 16, wherein:

connecting an $m^{th}$ electrode to an electrical earth during an $n^{th}$ and $n+1^{st}$ time interval;

connecting the $m^{th}$ electrode to the electrical earth or insulating it from the electrical measuring circuit and the electrical earth during an $n+2^{nd}$ time interval;

coupling the $m^{th}$ electrode to the electrical measuring circuit during an $n+3^{rd}$ and $n+4^{th}$ time interval for measuring the electrical capacitance in one of these measuring intervals and for measuring the electrical resistance in the other measuring interval;

measuring a temperature T of an $m^{th}$ electrode during an $n+5^{th}$ time interval;

connecting an $m^{th}$ electrode to an electrical earth during an $n+6^{th}$ and $n+7^{th}$ time interval;

insulating the $m^{th}$ electrode from the electrical measuring circuit and the electrical earth during an $n+8^{th}$ and further time intervals; and performing the above stated steps for an $m+1^{st}$ electrode adjacent to the $m^{th}$ electrode at a $k=n+3^{rd}$ interval.

* * * * *